Patented Jan. 3, 1950

2,493,251

UNITED STATES PATENT OFFICE 2,493,251

METHODS OF INTRODUCING BISMUTH INTO STEEL OR IRON BATHS

Gustaf Newton Kirsebom, Riksby, Sweden, assignor to Hellefors Bruks Aktiebolag, Hällefors, Sweden, a corporation of Sweden No Drawing. Application August 26, 1947, Serial No. 770,755. In Sweden September 2, 1946

2 Claims. (Cl. 75—129)

The present invention relates to a method of introducing bismuth into steel or iron baths or into a steel alloy. As is well known the bismuth and also lead, cadmium, selenium, sulphur etc. are introduced into steel and steel alloys inter alia to facilitate chip removal during the subsequent mechanical working or machine-working of the steel.

When adding the above-mentioned additions it has been found that a large portion of same vaporizes, before alloying takes place. As regards lead and bismuth, these losses usually amount to about 65%. These losses are usually caused by evaporation and oxidation, the vapours of lead causing great difficulties owing to the great risk of poisoning. In this case bismuth is preferable, because there is no risk of poisoning the workmen by using this metal.

It has already been proposed to add the bismuth metal in the form of alloys with earth alkali metals etc. When using this method, it was not possible to avoid certain losses.

It is an object of the present invention to remove all these drawbacks and the invention is characterized by the fact that the bismuth metal is added to the iron or steel bath in the form of a bismuthiferrous ferro-manganese. Preferably a ferro-manganese containing up to 20% bismuth is used. By such procedure losses of bismuth are practically completely avoided and good dispersion of the bismuth-metal in the steel is obtained. Simultaneously an introduction of manganese into the steel is obtained, which under certain circumstances may be desirable.

To further elucidation of the invention, the following example is given.

Example 36 kgs. ferro-manganese, containing 2.43 kgs. bismuth in the form of a diffusion were introduced into a steel-furnace, containing 6 tons steel. After discharging the furnace the steel contained 0.036% bismuth, corresponding to about 90% of the total amount of bismuth supplied to the alloy.

What I claim is:

1. A method of introducing bismuth into ferrous metal baths, characterized in that the bismuth metal is added in the form of bismuthiferrous ferro-manganese.

2. A method according to claim 1, characterized in that the bismuth-metal is added in the form of bismuthiferrous ferro-manganese containing up to 20% bismuth.

GUSTAF NEWTON KIRSEBOM.

REFERENCES CITED

The following references are of record in the file of this patent:

UNITED STATES PATENTS

| Number | Name | Date |
|---|---|---|
| 2,273,731 | Peoples et al. | Feb. 17, 1942 |
| 2,378,548 | Greggs et al. | June 19, 1945 |